Sept. 2, 1924.  W. SIEGERIST  1,506,948

TOOL FOR INSTALLING BOILER HANDHOLE CAPS

Filed Aug. 4, 1923

INVENTOR
Walter Siegerist.
By Bakewell & Church
ATTORNEYS

Patented Sept. 2, 1924.

1,506,948

UNITED STATES PATENT OFFICE.

WALTER SIEGERIST, OF ST. LOUIS, MISSOURI, ASSIGNOR TO HEINE BOILER COMPANY, OF ST. LOUIS, MISSOURI, A CORPORATION OF MISSOURI.

TOOL FOR INSTALLING BOILER HANDHOLE CAPS.

Application filed August 4, 1923. Serial No. 655,672.

*To all whom it may concern:*

Be it known that I, WALTER SIEGERIST, a citizen of the United States, residing at St. Louis, Missouri, have invented a certain new and useful Improvement in Tools for Installing Boiler Handhole Caps, of which the following is a full, clear, and exact description, such as will enable others skilled in the art to which it appertains to make and use the same.

This invention relates to tools of the kind that are used for seating or unseating a hollow element of substantially cup shape in general outline that is positioned in a member, such as the tools used in the operation of installing boiler hand hole caps of the type that comprises a tapered portion which projects forwardly through a hand hole in one wall of the water leg of a boiler.

The main object of my invention is to provide a tool of the general type referred to in which the means that effects the movement of the hand hold cap to seat it tightly in the hand hole in which it is positioned is actuated hydraulically or pneumatically.

Another object is to provide a tool of the general type referred to that comprises means, actuated hydraulically or by a fluid under pressure, for causing the jaws of the tool to be held in clamping engagement with the hand hole cap and for moving the cap longitudinally or endwise to draw it into the hand hole tightly enough to produce a steam-and-water tight joint between the tapered portion of the cap and the part of the boiler in which the cap is mounted. Other objects and desirable features of my invention will be hereinafter pointed out.

Figure 1 of the drawings is a vertical sectional view of a tool embodying my invention.

I have herein illustrated my invention embodied in a tool that is adapted to be used for drawing a hollow hand hole cap $x$ into a hand hole in a wall $y$ that forms part of the water leg of a boiler. I wish it to be understood that said tool is capable of use for various other purposes, such, for example, as unseating or removing a hollow, cup-shaped element that is firmly seated in a member.

Figure 2:
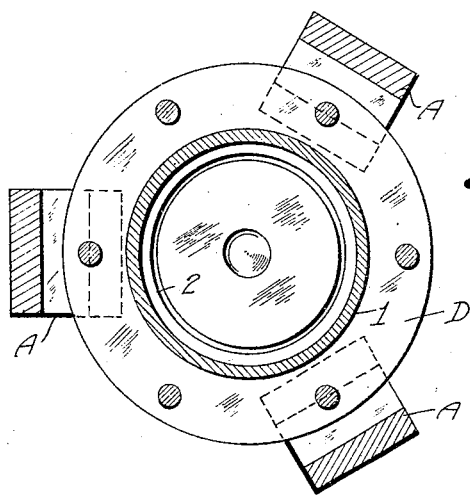
Figure 2 is a horizontal sectional view, taken on the line 2—2 of Figure 1.
Figure 3:
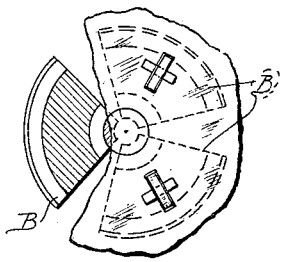
Figure 3 is a horizontal sectional view, taken on the line 3—3 of Figure 1.
Figure 1:
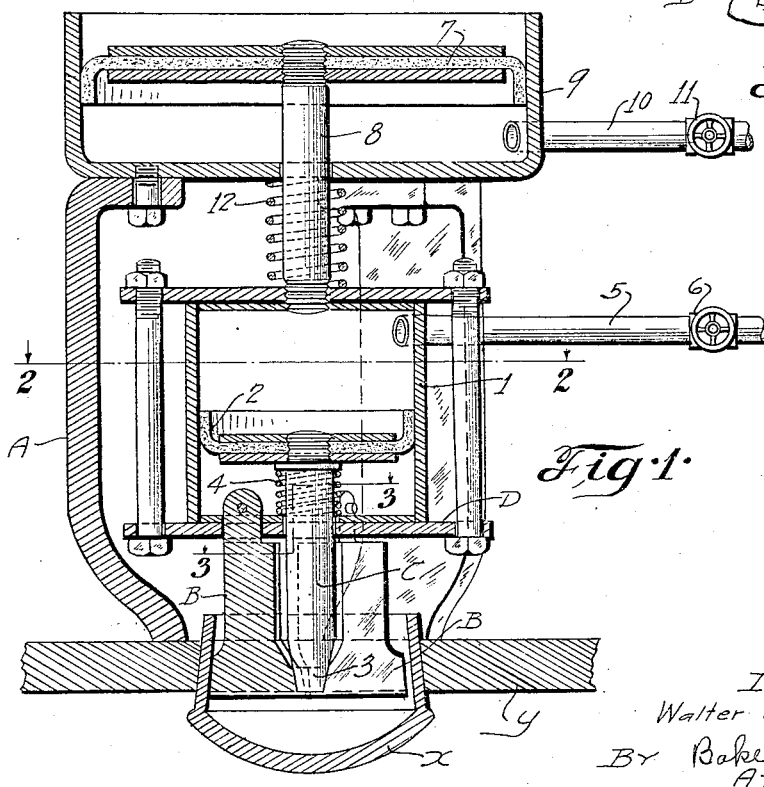

The tool comprises a frame A having a plurality of spaced portions that are adapted to be arranged in engagement with the front side of the part $y$ of the boiler in which the hand hole cap is to be seated, a plurality of jaws B that are adapted to be introduced into the open end of the cap, a means C for expanding said jaws so as to force them into snug engagement with the tapered portion of the cap, and means operated either by a liquid or by a fluid under pressure for moving the jaws B in a direction to securely seat the cap $x$ in the part $y$ of the boiler in which it is positioned. Preferably a fluid operated means is provided for expanding the jaws after they have been introduced into the hand hole cap and a fluid-operated means is provided for thereafter moving the jaws in a direction to draw the cap into the hand hole. In the preferred form of my invention, as herein illustrated, the jaws B are pivotally mounted on a reciprocating jaw carrier D that is equipped with a cylinder 1 in which a piston 2 is arranged. The jaw expanding means C, previously referred to, consists of a plunger provided with a tapered portion 3, which, when moved into engagement with tapered surfaces on the inner sides of the jaws B, expands said jaws and causes them to be forced snugly into engagement with the inner side of the tapered portion of the cap $x$. Normally, the plunger C is held in its retracted position by an expansion spring 4 surrounding said plunger and arranged between the piston 2 and the part of the jaw carrier D on which the jaws are pivotally mounted. In order to expand the jaws, an operating medium which may either be a liquid or a fluid under pressure, is introduced into the cylinder 1 through a pipe 5, thereby causing the piston 2 to move in a direction to force the tapered portion of the plunger C into engagement with the co-operating tapered surfaces on the jaws B. The pipe 5 is provided with a controlling valve 6 which is adapted to be closed after the jaws B have been expanded, so as to retain the jaws in clamping engagement with the hand hole cap. Thereafter, the jaw carrier D is moved bodily in a direction to cause the jaws to exert endwise pressure on the cap and draw it tightly into the hand hole. In the tool herein shown the means that is used for moving the jaw carrier D bodily in a direction to seat the hand hole cap consists of a piston 7 connected by a piston rod 8 to the jaw carrier D and adapted to be moved longitudinally of a cylinder 9 in which it is reciprocatingly mounted, by introducing a liquid or a fluid under pressure into said cylinder through a pipe 10 that leads to the cylinder and which is equipped with a controlling valve 11. When the valve 11 is turned in a position to permit the operating medium to escape from the cylinder 9, the piston 7 moves in the opposite direction, under the influence of a spring 12 that is interposed between the end wall of the cylinder 9 and the portion of the jaw carrier D to which the piston rod 8 is connected, the cylinder 9 being mounted on the frame A of the tool, as shown in Figure 1.

While I have herein illustrated the tool as being equipped with pivotally mounted jaws that are adapted to be expanded and collapsed by reciprocating a plunger or the like that is arranged between said jaws, I wish it to be understood that it is immaterial what type or kind of jaws the tool is equipped with and what means is employed for expanding and contracting said jaws. The specific details of construction of the various parts of the tool are also immaterial, as my broad idea, briefly stated, consists of a tool equipped with any suitable kind of jaws that can be expanded and contracted and which are of such form that they can be arranged inside of a hollow member, an hydraulic or fluid operated means for effecting the engagement of the jaws with the article or member that is being seated or unseated by the tool, and an hydraulic or fluid operated means for causing the jaws to exert pressure on said article or member in a direction to seat or unseat the same.

Having thus described my invention, what I claim as new and desire to secure by Letters Patent is:

1. A tool for the purpose described, comprising jaws adapted to be introduced into a hollow article and thereafter moved into engagement with said article, a piston for moving said jaws in a direction to cause them to exert pressure on said hollow article and shift it relatively to a part in which it is positioned, a cylinder in which said piston is reciprocatingly mounted, and means for supplying an operating medium to said cylinder.

2. A tool, comprising jaws which are adapted to act upon an article positioned in a member, a piston associated with said jaws, means for causing an operating medium to act on said piston so as to move the jaws into engagement with said article, and a second piston adapted to be actuated by an operating medium for thereafter moving said jaws in a direction to shift said article relatively to the member in which it is positioned.

3. A tool for installing boiler hand hole caps, comprising jaws that are adapted to be introduced into a cap that is positioned in a hand hole, an hydraulic or fluid operated means for expanding said jaws and holding them in clamping engagement with said cap, and an hydraulic or fluid operated means for thereafter bodily shifting said jaws in a direction to cause said cap to be drawn tightly into the hand hole.

4. A tool for installing a hand hole cap in a hand hole in the water leg of a boiler, comprising a supporting structure adapted to be arranged in engagement with the water leg, jaws that are adapted to be introduced into the cap, means for expanding said jaws, a cylinder on said supporting structure provided with a piston that is operatively connected with the jaws, and means for admitting an operating medium to said cylinder so as to cause the jaws to exert pressure on the cap in a direction to seat it firmly in the hand hole.

5. A tool for installing a hand hole cap in the water leg of a boiler, comprising a supporting structure adapted to be arranged in engagement with the water leg, jaws that are adapted to be introduced into a hand hole cap positioned in said water leg, an hydraulic or fluid operated means for expanding said jaws and holding them in clamping engagement with the cap, and an hydraulic or fluid operated means carried by said supporting structure and operatively connected with the jaws for moving said jaws in a direction to draw the cap tightly into the water leg.

6. A tool for installing a hand hole cap in a hand hole, comprising a supporting structure adapted to be arranged in engagement with the part that contains the hand hole, a jaw carrier provided with jaws that are adapted to be introduced into the cap, a cylinder on said jaw carrier equipped with a piston, means for admitting an operating medium to said cylinder to cause the jaws to expand into engagement with the cap, a second cylinder on said supporting structure provided with a piston that is connected to the jaw carrier, and means for admitting an operating medium to said second cylinder, for the purpose described.

7. A tool for installing hollow hand hole caps, comprising a supporting structure adapted to be arranged in engagement with the part that contains a hand hole in which a cap is positioned, a jaw carrier on said supporting structure provided with jaws that are adapted to be introduced into the cap, a cylinder on said supporting structure provided with a piston, means operated by said piston for expanding the jaws and holding them in clamping engagement with the cap, a second cylinder on said supporting structure provided with a piston that is connected to said jaw carrier, and means for enabling an operating medium to be admitted to and exhausted from said cylinders, for the purpose described.

8. A tool for installing hollow hand hole caps, comprising a supporting structure adapted to be arranged in engagement with a part that contains a hand hole in which a cap is positioned, a reciprocating jaw carrier on said supporting structure, pivotally mounted jaws on said carrier that are adapted to be introduced into the cap, a cylinder on said jaw carrier provided with a piston, a plunger connected to said piston for expanding the jaws, a spring that exerts pressure on said piston in a direction tending to move the plunger into a position to permit the jaws to collapse, a second cylinder on said supporting structure provided with a piston that is connected with said jaw carrier, and means for admitting an operating medium to and from said cylinder, for the purpose described.

WALTER SIEGERIST.